US008641536B2

(12) United States Patent
Santamarina et al.

(10) Patent No.: US 8,641,536 B2

(45) Date of Patent: Feb. 4, 2014

(54) TOOL BIT OR TOOL HOLDER FOR POWER TOOL

(71) Applicant: Black & Decker Inc., Newark, DE (US)

(72) Inventors: Alland Santamarina, Columbia, MD (US); Vincent Wensheng Zou, Lutherville-Timonium, MD (US); Michael Peters, Lutherville, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 13/971,920

(22) Filed: Aug. 21, 2013

(65) Prior Publication Data

US 2013/0340579 A1 Dec. 26, 2013

Related U.S. Application Data

(63) Continuation of application No. 12/846,912, filed on Jul. 30, 2010, now Pat. No. 8,540,580.

(60) Provisional application No. 61/274,042, filed on Aug. 12, 2009.

(51) Int. Cl.
*F16D 7/04* (2006.01)

(52) U.S. Cl.
USPC ................... 464/37; 81/473; 81/474; 81/475; 81/477; 81/478; 173/178

(58) Field of Classification Search
USPC ........... 81/436–439, 467, 473–478; 192/56.1, 192/38; 464/30, 32–35, 37, 41; 173/178
See application file for complete search history.

(56) References Cited

U.S. PATENT DOCUMENTS 516,894 A 3/1894 List
636,431 A 11/1899 Hinson
(Continued)

FOREIGN PATENT DOCUMENTS

DE 1712948 U 12/1955
DE 1725799 U 7/1956
(Continued)

OTHER PUBLICATIONS

Kuhn, Thomas—European Search Report re: EP09161833—Nov. 14, 2012—8 pages—Munich.

(Continued)

*Primary Examiner* — Alicia Torres
(74) *Attorney, Agent, or Firm* — Scott B. Markow

(57) ABSTRACT

A tool holder for use with a power tool includes an input shaft with a rear portion couplable to a power tool, and an output shaft with a front portion couplable to a tool bit. A clutch assembly releasably non-rotationally couples a front portion of the input shaft to a rear portion of the output shaft, and includes a recess in the front portion of the input shaft or the rear portion of the output shaft, an aperture in the other of the front portion of the input shaft or the rear portion of the output shaft, a roller received in the aperture, and a spring that biases the roller radially inwardly toward the recess. The spring enables release of the roller radially outwardly from the recess when a predetermined torque threshold is exceeded, such that torque is not transmitted from the input shaft to the output shaft.

20 Claims, 14 Drawing Sheets

(56) References Cited

U.S. PATENT DOCUMENTS

| | | | |
|---|---|---|---|
| 1,325,464 | A | 12/1919 | Decker |
| 1,398,763 | A | 11/1921 | Bearens |
| 1,651,822 | A | 12/1927 | Johnston |
| 1,795,135 | A | 3/1931 | Molly |
| 1,805,692 | A | 5/1931 | Ferenci |
| 1,810,450 | A | 6/1931 | Von Broembsen |
| 1,812,445 | A | 6/1931 | Mayer |
| 2,246,996 | A | 6/1941 | Kreis |
| 2,256,478 | A | 9/1941 | Hill |
| 2,263,709 | A | 11/1941 | Van Sittert |
| 2,344,673 | A | 3/1944 | Brown |
| 2,409,385 | A | 10/1946 | Pletcher |
| 2,514,569 | A | 7/1950 | Enquist |
| 2,631,696 | A | 3/1953 | Yarber |
| 2,668,426 | A | 2/1954 | Hoover |
| 2,692,486 | A | 10/1954 | Anderson |
| 2,773,370 | A | 12/1956 | Intraub et al. |
| 2,854,831 | A | 10/1958 | Rothweiler |
| 2,860,498 | A | 11/1958 | Crossley |
| 2,882,704 | A | 4/1959 | Quackenbush |
| 2,957,323 | A | 10/1960 | Elliott et al. |
| 3,005,325 | A | 10/1961 | Eckman |
| 3,205,985 | A | 9/1965 | Pearl |
| 3,208,316 | A | 9/1965 | Scribner |
| 3,499,511 | A | 3/1970 | Bouhot |
| 3,616,883 | A | 11/1971 | Sindelar |
| 3,631,945 | A | 1/1972 | Ollearo |
| 3,667,575 | A | 6/1972 | Bouhot |
| 3,744,350 | A | 7/1973 | Raff |
| 3,794,124 | A | 2/1974 | Biersack |
| 3,804,222 | A | 4/1974 | Reams |
| 3,832,916 | A | 9/1974 | Schoeps |
| 3,859,821 | A | 1/1975 | Wallace |
| 3,877,253 | A | 4/1975 | Yeagle |
| 3,934,629 | A | 1/1976 | Boman |
| 3,991,590 | A | 11/1976 | Brems et al. |
| 4,238,978 | A | 12/1980 | Leone |
| 4,253,554 | A | 3/1981 | Nisenson |
| 4,265,347 | A | 5/1981 | Dischler |
| 4,362,161 | A | 12/1982 | Reimels et al. |
| 4,572,041 | A | 2/1986 | Rissmann |
| 4,619,567 | A | 10/1986 | Campbell |
| 4,774,864 | A | 10/1988 | Dossier |
| 4,830,001 | A | 5/1989 | Walus |
| 4,901,610 | A | 2/1990 | Larson et al. |
| 4,979,408 | A | 12/1990 | Hayashi |
| 4,986,369 | A | 1/1991 | Fushiya et al. |
| 5,072,650 | A | 12/1991 | Phillips |
| 5,123,313 | A | 6/1992 | Andersson |
| 5,201,374 | A | 4/1993 | Rahm |
| 5,309,799 | A | 5/1994 | Jore |
| 5,346,023 | A | 9/1994 | Takagi et al. |
| 5,540,527 | A | 7/1996 | Bohnet et al. |
| 5,704,261 | A | 1/1998 | Strauch et al. |
| 5,722,894 | A | 3/1998 | Kojima |
| 5,737,983 | A | 4/1998 | Rennerfelt |
| 5,746,298 | A | 5/1998 | Krivec et al. |
| 5,862,705 | A | 1/1999 | Lee |
| 5,868,208 | A | 2/1999 | Peisert et al. |
| 6,053,675 | A | 4/2000 | Holland et al. |
| 6,062,114 | A | 5/2000 | Rahm |
| 6,076,438 | A | 6/2000 | Rahm |
| RE36,797 | E | 8/2000 | Eggert et al. |
| 6,123,157 | A | 9/2000 | Barnes |
| 6,132,435 | A * | 10/2000 | Young ........................... 606/104 |
| 6,321,855 | B1 | 11/2001 | Barnes |
| 6,330,846 | B1 | 12/2001 | Strauch |
| 6,345,560 | B1 | 2/2002 | Strauch et al. |
| 6,364,318 | B1 | 4/2002 | Bedi et al. |
| 6,487,943 | B1 | 12/2002 | Jansson et al. |
| 6,536,536 | B1 | 3/2003 | Gass et al. |
| 6,568,693 | B2 | 5/2003 | Glass |
| 6,640,911 | B2 | 11/2003 | Lieser et al. |
| 6,644,150 | B2 | 11/2003 | Chen |
| 6,702,090 | B2 | 3/2004 | Nakamura et al. |
| D488,695 | S | 4/2004 | Peterson |
| 6,793,023 | B2 | 9/2004 | Holzer et al. |
| 6,796,921 | B1 | 9/2004 | Buck et al. |
| 6,834,730 | B2 | 12/2004 | Gass et al. |
| 6,918,913 | B2 | 7/2005 | White |
| RE38,778 | E | 8/2005 | Eggert et al. |
| D516,894 | S | 3/2006 | Singh |
| 7,063,201 | B2 | 6/2006 | Nakamura et al. |
| 7,086,813 | B1 | 8/2006 | Boyle et al. |
| 7,093,668 | B2 | 8/2006 | Gass et al. |
| 7,107,883 | B2 | 9/2006 | Casutt |
| 7,121,358 | B2 | 10/2006 | Gass et al. |
| 7,134,509 | B2 | 11/2006 | Rahm |
| 7,150,680 | B2 | 12/2006 | White |
| 7,197,968 | B2 | 4/2007 | Bubel |
| 7,261,023 | B2 | 8/2007 | Taguchi |
| 7,318,691 | B2 | 1/2008 | Osburn |
| D589,319 | S | 3/2009 | Peters |
| 7,677,844 | B2 | 3/2010 | Schell et al. |
| 7,793,560 | B2 | 9/2010 | Bodine et al. |
| 8,083,596 | B1 | 12/2011 | Silver et al. |
| 2002/0130006 | A1 | 9/2002 | Nakamura et al. |
| 2002/0135140 | A1 | 9/2002 | Mitchell et al. |
| 2004/0099106 | A1 | 5/2004 | Strauch et al. |
| 2005/0133329 | A1 | 6/2005 | Gradu et al. |
| 2006/0016283 | A1 | 1/2006 | Owa et al. |
| 2006/0233621 | A1 | 10/2006 | Schell et al. |
| 2006/0254786 | A1 | 11/2006 | Murakami et al. |
| 2007/0114050 | A1 | 5/2007 | Baumann et al. |
| 2007/0125192 | A1 | 6/2007 | Mowbray et al. |
| 2008/0060849 | A1 | 3/2008 | Entchev et al. |
| 2008/0107491 | A1 | 5/2008 | Osburn |
| 2008/0217870 | A1 | 9/2008 | Shibata |
| 2009/0114176 | A1 | 5/2009 | Wutzler |

FOREIGN PATENT DOCUMENTS

| | | | |
|---|---|---|---|
| DE | 7403870 | U | 5/1974 |
| DE | 2335184 | A1 | 1/1975 |
| DE | 2511469 | A1 | 3/1975 |
| DE | 2427352 | A1 | 12/1975 |
| DE | 3104626 | A1 | 9/1982 |
| DE | 3437083 | A1 | 4/1986 |
| DE | 3443072 | A1 | 5/1986 |
| DE | 8607168 | U1 | 7/1987 |
| DE | 3807308 | A1 | 9/1989 |
| DE | 4143218 | A1 | 9/1992 |
| DE | 4300083 | A1 | 7/1994 |
| DE | 4302083 | A1 * | 7/1994 |
| DE | 19722798 | A1 | 12/1998 |
| DE | 19843452 | A1 | 3/2000 |
| DE | 10122272 | A1 | 11/2002 |
| DE | 4143678 | B4 | 3/2005 |
| DE | 202005017686 | U1 | 1/2006 |
| DE | 102006021506 | A1 | 11/2006 |
| DE | 102005057368 | A1 | 6/2007 |
| EP | 0608083 | A1 | 7/1994 |
| EP | 0988134 | A1 | 3/2000 |
| GB | 1333153 | | 10/1973 |
| JP | 04-141332 | | 5/1992 |
| JP | 2007-190666 | | 8/2007 |
| WO | 02/00396 | A1 | 1/2002 |
| WO | 2007/104286 | A1 | 9/2007 |

OTHER PUBLICATIONS

Coja, Michael—European Search Report re: EP10171845—Oct. 26, 2010—8 pages—The Hague.

Wurzer, Oliver—European Search Report re: EP10153081—Mar. 1, 2010—7 pages—Munich.

Wurzer, Oliver—European Search Report re: EP08162397—Jan. 23, 2009—10 pages—Munich.

* cited by examiner

TOOL BIT OR TOOL HOLDER FOR POWER TOOL

RELATED APPLICATIONS

This application is a continuation of U.S. patent application Ser. No. 12/846,912, filed Jul. 30, 2010, titled "Tool Bit or Tool Holder for Power Tool," which claims priority, under 35 U.S.C. §119, to U.S. Provisional Patent Application No. 61/274,042, filed Aug. 12, 2009, titled "Tool holder for Impact Driver." Each of the aforementioned applications is incorporated by reference.

TECHNICAL FIELD

This application relates to a tool bit or a tool holder for use with a power tool, such as an impact driver, a screwgun, a drill, a hammer drill, or a screwdriver.

BACKGROUND

When a power tool (e.g., an impact driver, a screwgun, a drill, a hammer drill, or a screwdriver) is utilized to drive fasteners, such as screws or nuts, into a workpiece, a large driving torque (e.g., approximately 500 inch-lbs) may be generated. In certain situations, such as with use with an impact driver or hammer drill, that torque may be generated in rapid cycles (e.g., approximately every 2 milliseconds). Due to the large driving torque and the rapid cycling, current tool bits (e.g., screwdriving bits) and/or tool holders often fail when used with these types of power tools, especially with impact drivers. This may be due to the fact that the tool bits and tool holders often have a lower torque rating (e.g., approximately 200 inch-lbs) than the torque rating of the power tool. It would be desirable to have a tool bit and/or a tool holder that can withstand the torque loading of such power tools in these situations.

SUMMARY

This application relates to a tool, such as a tool bit (e.g., a screwdriving bit or drill bit) or tool holder (e.g., for a screwdriving bit, a drill bit, or a screw or nut), for use with a power tool (e.g., an impact driver, a screwgun, a drill, a hammer drill, or a screwdriver). The tool bit or tool holder includes a clutch that that releases the force transmitted from the power tool to the tool when the torque exceeds a pre-determined amount. In one embodiment, the clutch makes use of a radial band-spring to prevent a series of rollers from slipping over an incline. By tuning the incline's geometry and the spring geometry it is possible to achieve the necessary torque for seating a screw prior to slipping. The spring-band geometry can be tuned to deliver the required radial force while minimizing the internal stresses to have adequate durability.

In one aspect, a tool for use with a power tool includes an input shaft, an output shaft, and a clutch assembly. The input shaft has a rear portion with a shank configured to be removably coupled to a power tool, and a front portion. The output shaft has a front portion configured to be coupled to a tool bit, and a rear portion, the rear portion of the output shaft rotatably coupled to the front portion of the input shaft. The clutch assembly releasably couples the input shaft to the output shaft, and includes: (i) at least one recess defined in one of the front portion of the input shaft and the rear portion of the output shaft; (ii) at least one aperture defined in the other of the front portion of the input shaft and the portion of the output shaft; (iii) at least one roller received in the at least one aperture; and (iv) a spring that biases the at least one roller radially inwardly into the at least one recess such that torque is transmitted from the input shaft to the output shaft when a predetermined torque threshold is not exceeded, and that enables release of the at least one roller radially outwardly from the at least one recess such that torque is not transmitted from the input shaft to the output shaft when the predetermined torque threshold is exceeded.

Implementations of this aspect may include one or more of the following features. The shank may have at least a portion having a hex shaped cross-section. The shank may also include a portion having a round cross-section disposed between the portion having the hex-shaped cross-section and the front portion of the input shaft to enable attachment of the shank to a screwgun. The front portion of the output shaft may define a socket configured to removably receive and a retain a tool bit. A tool bit may be integral with the front portion of the output shaft. The at least one recess may include a plurality of longitudinal grooves. The at least one aperture may include a plurality of longitudinal slots. The at least one roller may include a plurality of pins, each pin received in one of the plurality of longitudinal slots. The spring may include at least one spring band received around the longitudinal slots and pins to bias the pins into the longitudinal grooves when the predetermined torque threshold is not exceeded, and that expands to release the pins from the longitudinal grooves when the predetermined torque threshold is exceeded. The at least one spring band may include an inner spring band and an outer spring band at least partially overlapping the inner spring band. A clutch lock-out member may be moveable between a first position and a second position, wherein in the second position the clutch lock-out member prevents interruption of torque transmission from the input shaft to the output shaft In another aspect, a tool for use with a power tool, includes an input shaft, an output shaft, a spring-biased clutch, and a clutch lock-out assembly. The input shaft has a rear portion with a shank configured to be removably coupled to an output of a power tool. The output shaft has a front portion configured to be coupled to a tool bit. The spring-biased clutch couples a front portion of the input shaft to a rear portion of the output shaft so that torque is transmitted from the input shaft to the output shaft when a predetermined torque threshold is not exceeded, and torque transmission from the input shaft to the output shaft is interrupted when the predetermined torque threshold is exceeded. The clutch lock-out assembly is moveable between a first position and a second position, wherein in the second position the clutch lock-out member prevents interruption of torque transmission from the input shaft to the output shaft.

Implementations of this aspect may include one or more of the following features. The spring biased clutch may include: (i) a generally cylindrical shaft formed on one of a front portion of the input shaft and a rear portion of the output shaft, the cylindrical shaft defining at least one recess; (ii) a generally cylindrical sleeve formed on the other of the front portion of the input shaft and the rear portion of the output shaft, the sleeve received over the cylindrical shaft, and defining at least one aperture; (iii) at least one roller received in the at least one aperture; and (iv) at least one spring band received over the generally cylindrical sleeve, wherein the spring band biases the at least one roller into the at least one recess such that torque is transmitted from the input shaft to the output shaft when a predetermined torque threshold is not exceeded, and that expands to enable release of the at least one roller from the at least one recess such that torque is not transmitted from the input shaft to the output shaft when the predetermined torque threshold is exceeded.

The clutch lock-out assembly may include a longitudinally moveable bushing received over the spring band, the busing having an internal shoulder, such that when the bushing is in the first position, the bushing enables expansion of the spring band, and when the bushing is in the second position, the shoulder abuts the spring band to prevent expansion of the spring band. The at least one recess may include a plurality of longitudinal grooves, the at least one aperture may include a plurality of longitudinal slots, and the at least one roller may include a plurality of pins, each pin received in one of the plurality of longitudinal slots. The at least one spring band may include an inner spring band and an outer spring band at least partially overlapping the inner spring band. The shank may include a fitting having a hex shaped cross-section. The front portion of the output shaft may define a socket configured to removably receive and a retain a tool bit. A tool bit may be integral with the front portion of the output shaft.

In another aspect, a tool for use with a power tool includes an input shaft having a rear portion with a shank of hex-shaped cross-section configured to be removably coupled to an output of a power tool, an output shaft having a front portion defining a socket and a retaining member configured to receive a tool bit; and a clutch assembly coupling the input shaft to the output shaft. The clutch assembly includes: (i) a generally cylindrical shaft formed on one of a front portion of the input shaft and a rear portion of the output shaft, the cylindrical shaft defining a plurality of longitudinal grooves; (ii) a generally cylindrical sleeve formed on the other of the front portion of the input shaft and the rear portion of the output shaft, the sleeve received over the cylindrical shaft, and defining a plurality of longitudinal slots; (iii) a plurality of roller pins, each roller pin received in one of the plurality of longitudinal slots; and (iv) at least one spring band received over the generally cylindrical sleeve, the spring band biasing the roller pins into the longitudinal grooves such that torque is transmitted from the input shaft to the output shaft when a predetermined torque threshold is not exceeded, and spring band expanding to enable release of the roller pins from the longitudinal grooves such that torque is not transmitted from the input shaft to the output shaft when the predetermined torque threshold is exceeded. A clutch lock-out assembly that includes a bushing with an internal shoulder is received over the spring band and moveable between a first position and a second position, wherein when the bushing is in the first position, the bushing enables expansion of the spring band and interruption of torque transmission from the input shaft to the output shaft when the predetermined torque threshold is exceeded, and when the bushing is in the second position, the shoulder abuts the spring band to prevent expansion of the spring band and prevent interruption of torque transmission from the input shaft to the output shaft even when the predetermined torque threshold is exceeded.

DETAILED DESCRIPTION

Figure 1:
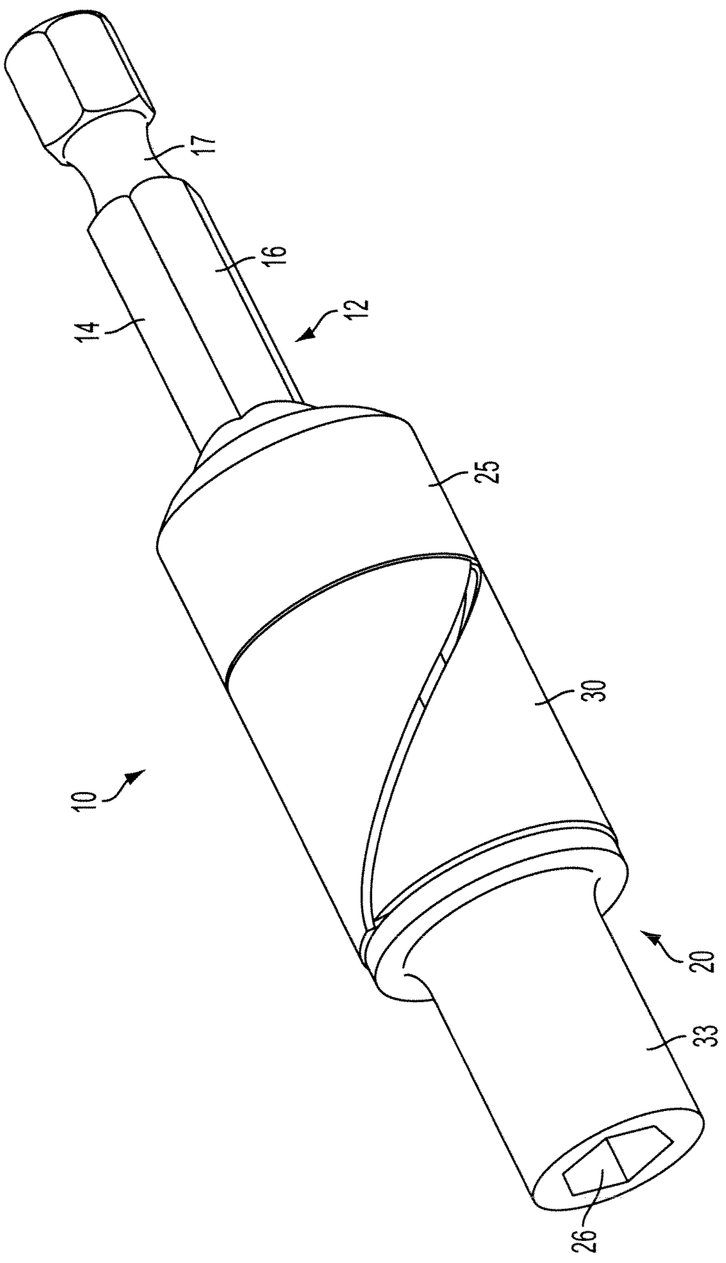
FIG. 1 is a perspective view of a first embodiment of a tool.
Figure 2:
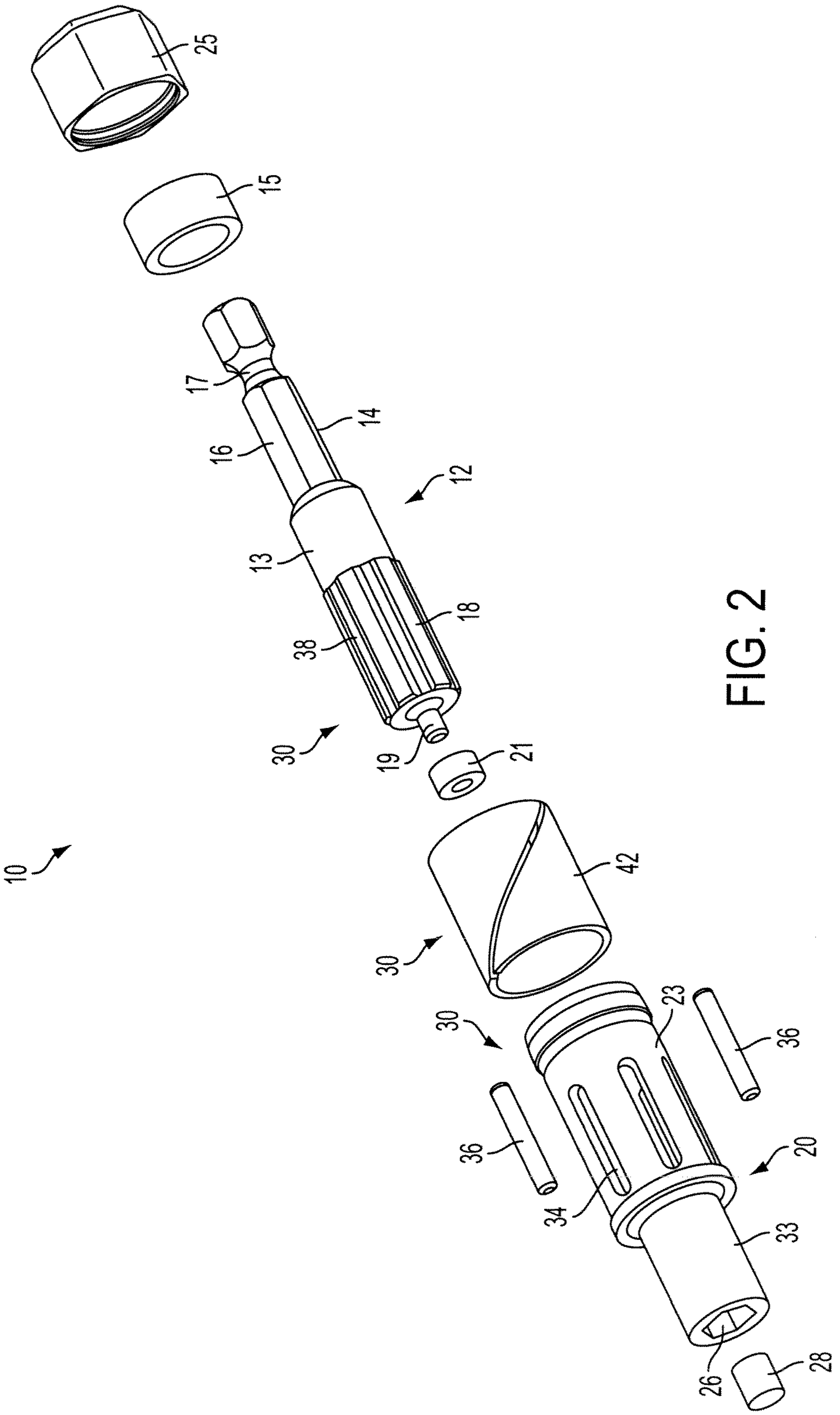
FIG. 2 is an exploded view of the tool of FIG. 1.

Referring to FIGS. 1 and 2, in one embodiment, a tool 10 for use with a power tool, such as an impact driver, a screwgun, a drill, a hammer drill, or a screwdriver, has a generally cylindrical input shaft 12, a generally cylindrical output shaft 20, and a clutch assembly 30 releasably coupling the input shaft 12 to the output shaft 20. The input shaft 12 has a rear portion 14, a middle portion 13, and a front portion 18. The rear portion 14 comprises a shank 16 with a hex-shaped cross-section and an annular groove 17, for coupling the rear portion 14 to a tool holder, such as a chuck, of the power tool. In other embodiments, the shank could have a different cross-sectional shape, such as round or square. The middle portion 13 is has a round cross-section and receives a large sleeve bearing 15. The front portion 18 has a round gross-section and plurality of recesses in the form of longitudinal grooves 38, the purpose of which will be described below. The front portion 18 also has a smaller diameter nose 19 of round cross-section, over which a small sleeve bearing 21 is received.

The output shaft 20 has a rear portion 23 and a front portion 33. The rear portion 23 defines a longitudinal bore 22 in which the front portion 18 of the input shaft 12, the small bearing 21, the middle portion 13 of the input shaft, and the large bearing 15 are rotatably received. The large sleeve bearing 15 and the small sleeve bearing 21 function as bearings between the input shaft 12 and the output shaft 20 to enable the shafts to rotate relative to one another. Received over the middle portion 13 of the input shaft 12 is an end cap 25 that axially retains the input shaft 12 relative to the output shaft 20.

The rear portion 23 of the output shaft 20 also defines a plurality apertures in the form of longitudinal slots 34 that receive a plurality of rollers in the form of pins 36, the purpose of which will be described below. The front portion 33 has a socket 26 for receiving a tool bit, such as a screwdriving bit or a drill bit. In the embodiment shown, the socket 26 has a hex shape for receiving a bit having a hex shaped shank. However, it should be understood that the socket 26 can have alternative shapes and/or configurations, such as a round shape. Inside the socket 26 is a magnet 28 that helps retain the tool bit inside the socket 26. It should be understood that additional or other bit retaining features may be included such as a retaining ring or a biased ball. In the alternative, the bit may be made integral with the output shaft (not shown).

The clutch assembly 30 releasably couples the input shaft 12 to the output shaft 20. The clutch assembly 30 includes the longitudinal grooves 38 in the input shaft 18, the longitudinal slots 34 and the pins 36 in the output shaft 36 and a spring band 42 that substantially surrounds the rear portion 23 of the output shaft 20, the pins 36, and the front portion 18 of the input shaft 12. The large bearing 15 and the cap 25 are received over the input shaft 12 to keep the input shaft 12, output shaft 20, and spring band 30 attached together in an axial direction.

Figure 4:
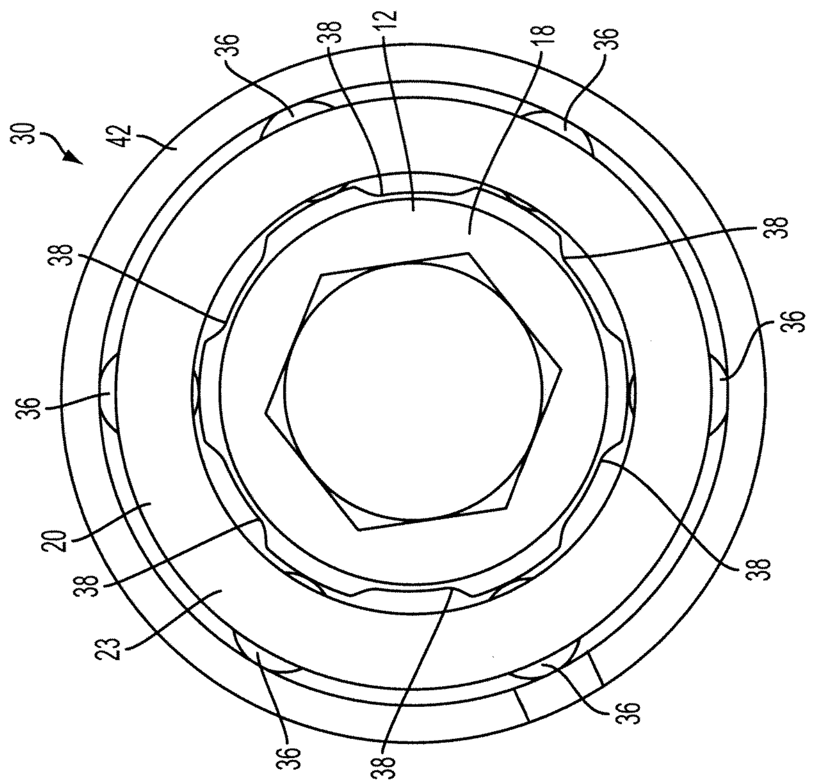
FIG. 4 is a cross-sectional view of the clutch of the tool of FIG. 1 in the disengaged condition.
Figure 3:
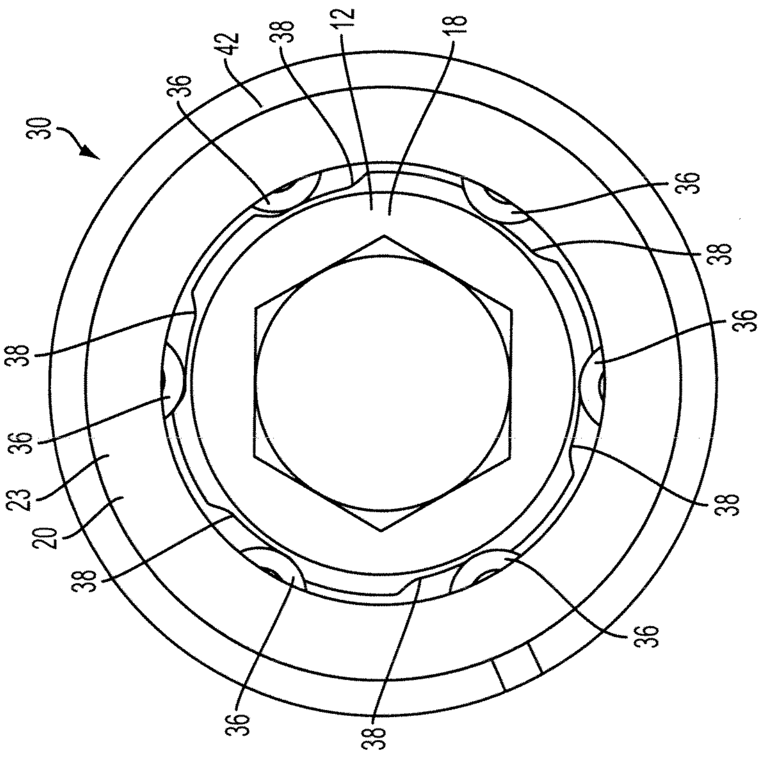
FIG. 3 is a cross-sectional view of the clutch of the tool of FIG. 1 in the engaged condition.

Referring also to FIG. 3, when the clutch 30 is engaged, the spring 42 biases the rollers 36 into the grooves 38 of the input shaft 12 so that rotation of the input shaft 12 by the power tool is transmitted to the output shaft 20, and thus to the bit being held in the socket 26. Referring also to FIG. 4, when the torque input to the input shaft 12 exceeds a predetermined amount (e.g., when the toque output from the power tool exceeds the torque rating on the clutch assembly), the spring 42 expands, and the rollers 36 escape from the grooves 38 on the input shaft 12 so that no torque is transmitted from the input shaft 12 to the output shaft 20. In this way, the clutch assembly 30 protects the tool 10 and the bit from instances of excessively high torque.

Figure 5:
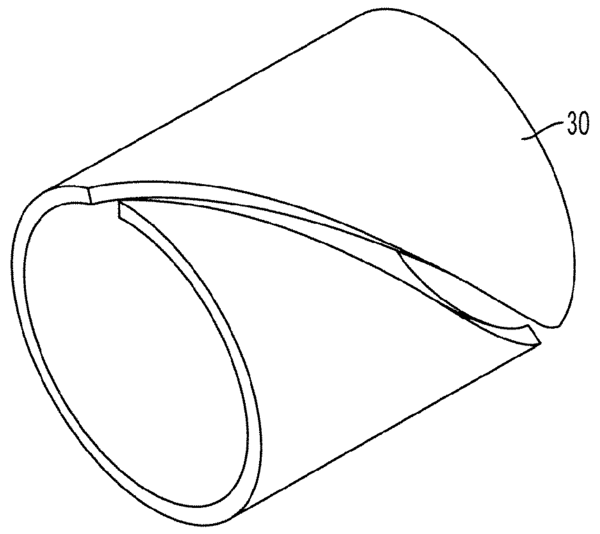
FIG. 5 is a perspective view of the band spring of the clutch of the tool of FIG. 1.
Figure 6:
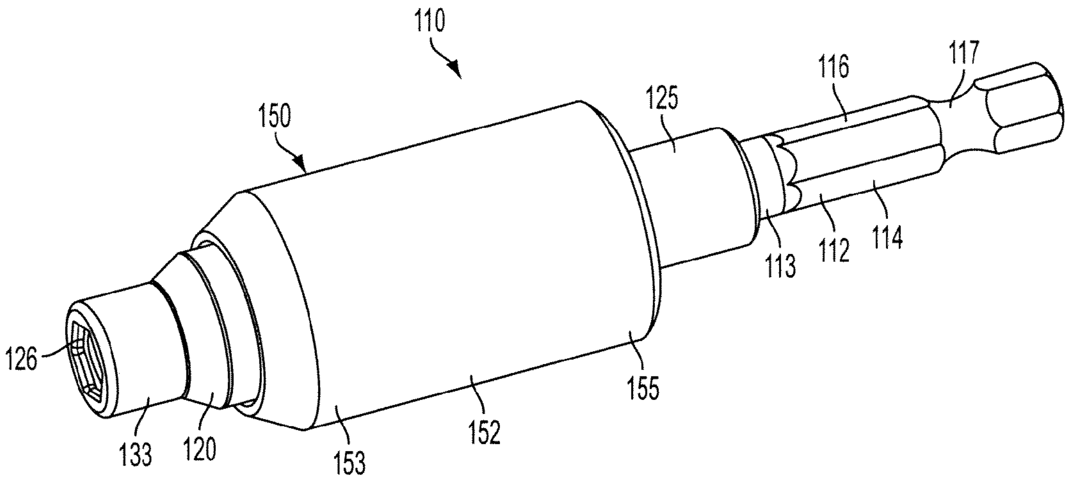
FIGS. 6 and 7 are perspective views of a second embodiment of a tool.
Figure 7:
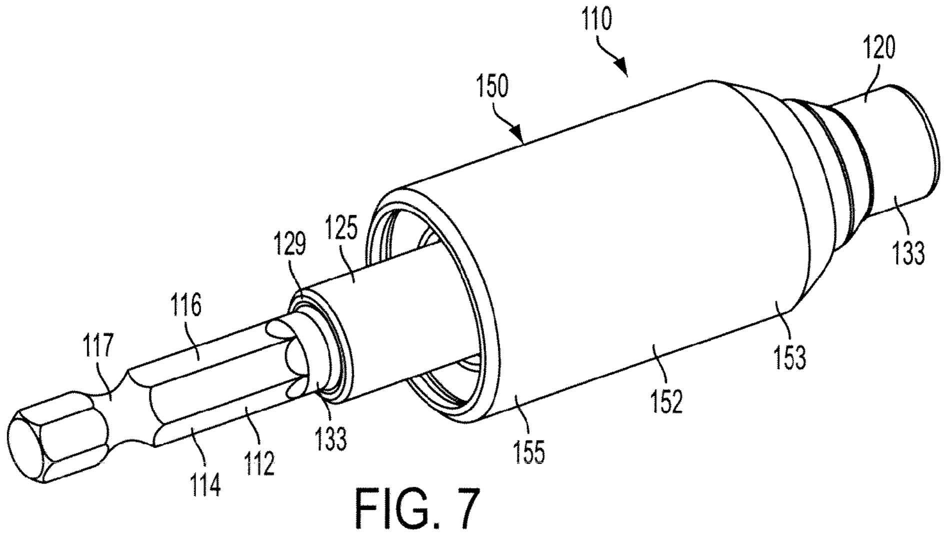
Figure 8:
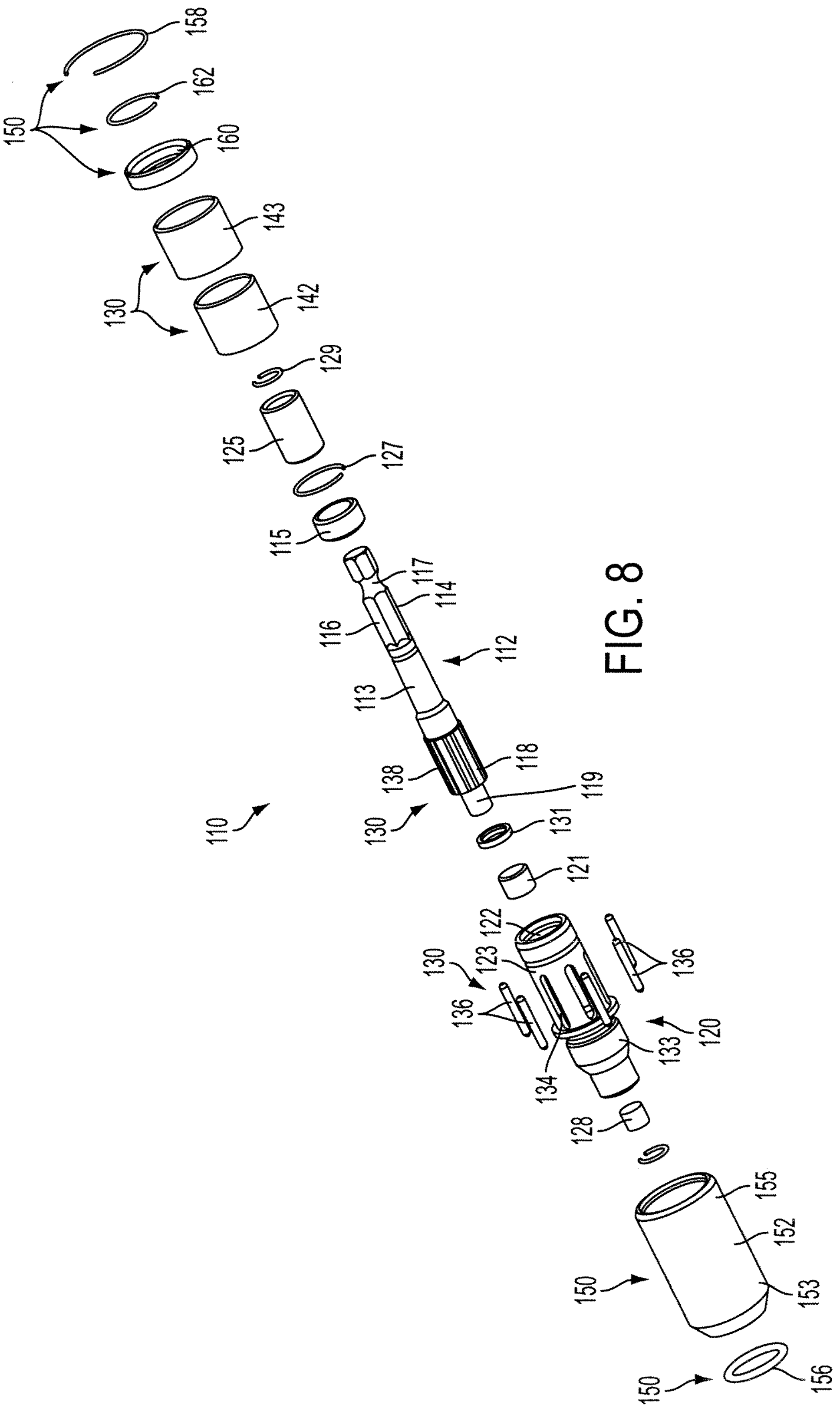
FIG. 8 is an exploded view of the tool of FIG. 6.

Referring also to FIG. 5, the spring is a split band spring with overlapping halves. This design enables the spring to be tuned to the amount of force required to have the clutch release upon a predetermined amount of torque being applied to the shank.

Referring to FIGS. 6-9, in a second embodiment, a tool 10 for use with a power tool has a generally cylindrical input shaft 112, a generally cylindrical output shaft 120, and a clutch assembly 130 releasably coupling the input shaft 112 to the output shaft 120. The input shaft 112 has a rear portion 114, a middle portion 113, and a front portion 118. The rear portion 114 comprises a shank 116 with a hex-shaped cross-section and an annular groove 117, for coupling the rear portion 114 to a tool holder, such as a chuck, of the power tool. In other embodiments, the shank could have a different cross-sectional shape, such as round or square. The middle portion 113 is has a round cross-section and receives a large sleeve bearing 115 and a large hog ring 127. that axially retains the sleeve bearing 115 on the middle portion 113 of the input shaft 112. In addition, a spacer sleeve 125 is received on the middle portion 113 of the input shaft 112 behind the large hog ring 127, and a small hog ring 129 axially retains the spacer sleeve 125 on the middle portion 113. The front portion 118 of the input shaft 112 has a round cross-section and plurality of recesses in the form of longitudinal grooves 138, the purpose of which will be described below. The front portion 118 also has a smaller diameter nose 119 of round cross-section, over which a washer 131 and a small sleeve bearing 121 are received.

Figure 9:
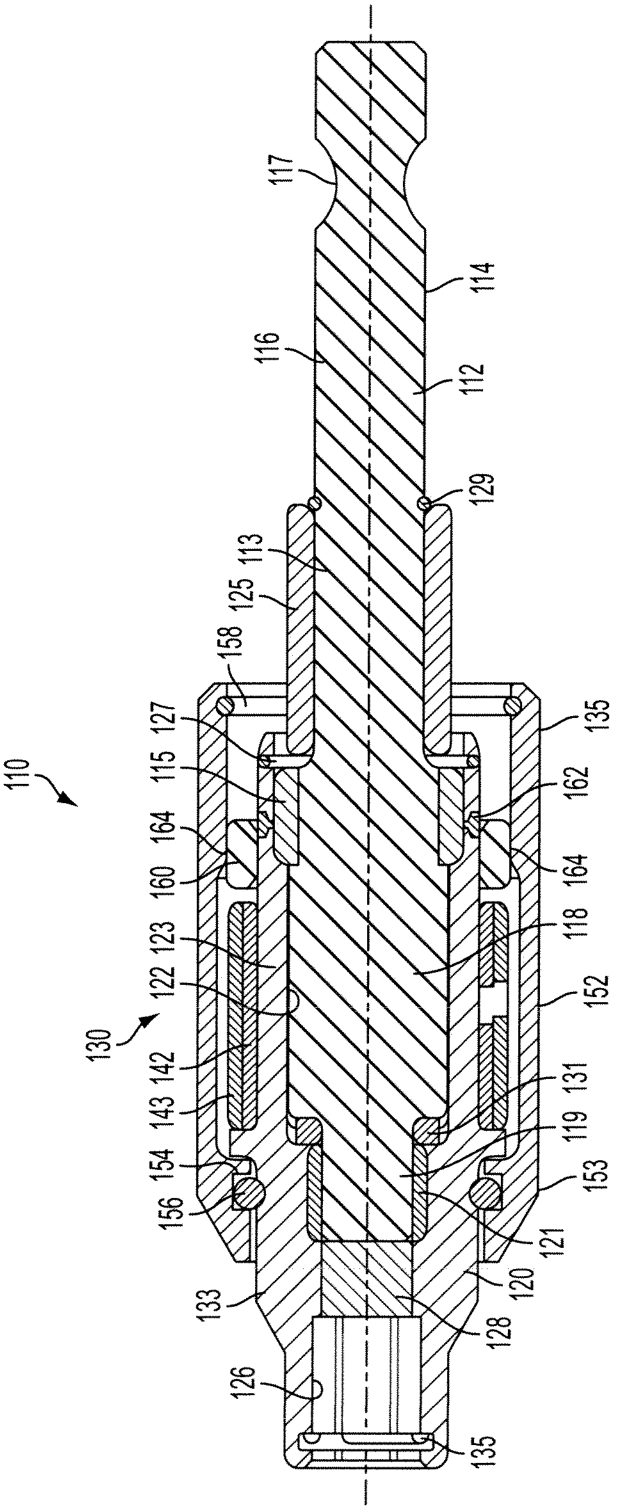
FIG. 9 is a cross-sectional view of the tool of FIG. 6.
Figure 10:
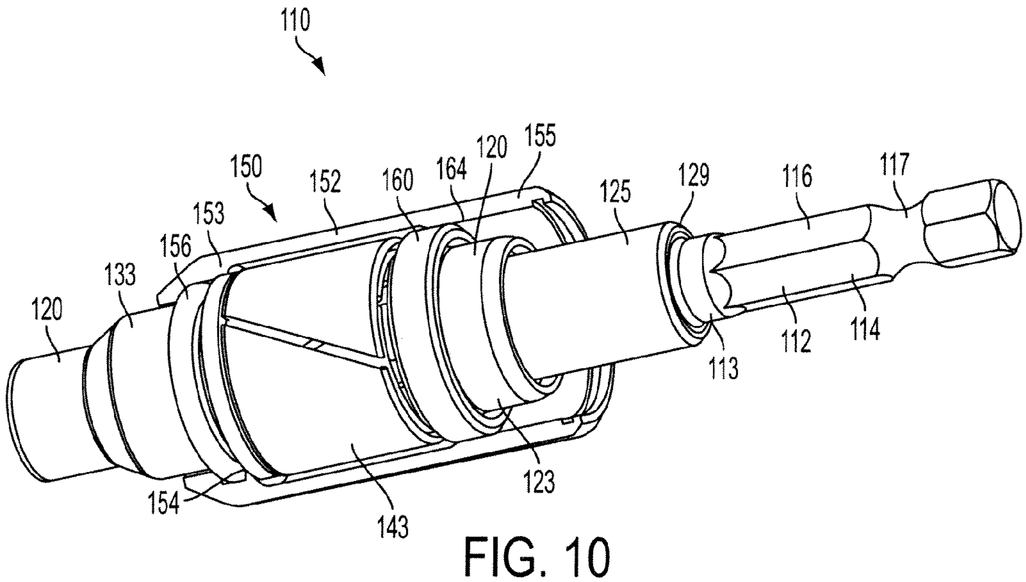
FIGS. 10 and 11 are a perspective views, partially in cross-section, of the tool of FIG. 6.
Figure 11:
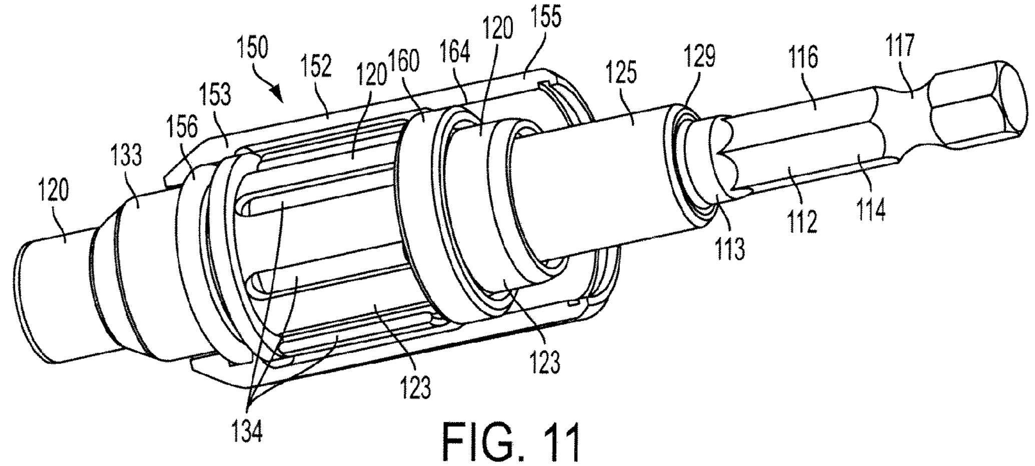

The output shaft 120 has a rear portion 123 and a front portion 133. The rear portion 123 defines a longitudinal bore 122 in which the front portion 118 of the input shaft 112, the small bearing 121, the a part of the middle portion 113 of the input shaft 112, and the large bearing 115 are rotatably received. As shown in FIG. 9, the large sleeve bearing 115 and the small sleeve bearing 121 together function as bearings between the input shaft 112 and the output shaft 120 so that the shafts can rotate relative to one another. The rear portion 123 also defines a plurality apertures in the form of longitudinal slots 134 that receive a plurality of rollers in the form of pins 136, the purpose of which will be described below. A spacer ring 160, the purpose of which is described below, is held onto rear portion 123 by a C-clip 162.

The front portion 133 of the output shaft 120 has a socket 126 for receiving a tool bit, such as a screwdriving bit or a drill bit. In the embodiment shown, the socket 126 has a hex shape for receiving a bit having a hex shaped shank. However, it should be understood that the socket 126 can have alternative shapes and/or configurations, such as a round shape. Inside the socket 126 is a magnet 128 and a retaining ring 135 that help retain the tool bit inside the socket 126. It should be understood that additional or other bit retaining features may be included such as a biased ball. In the alternative, the bit may be made integral with the output shaft (not shown).

The clutch assembly 130 releasably couples the input shaft 112 to the output shaft 120. The clutch assembly 130 includes the longitudinal grooves 138 in the input shaft 118, the longitudinal slots 134 and the pins 136 in the output shaft 136 and a pair of nested spring bands in the form of an inner spring band 142 and an outer spring band 143 that substantially surround the rear portion 123 of the output shaft 120, the pins 136, and the front portion 118 of the input shaft 112.

Figure 13:
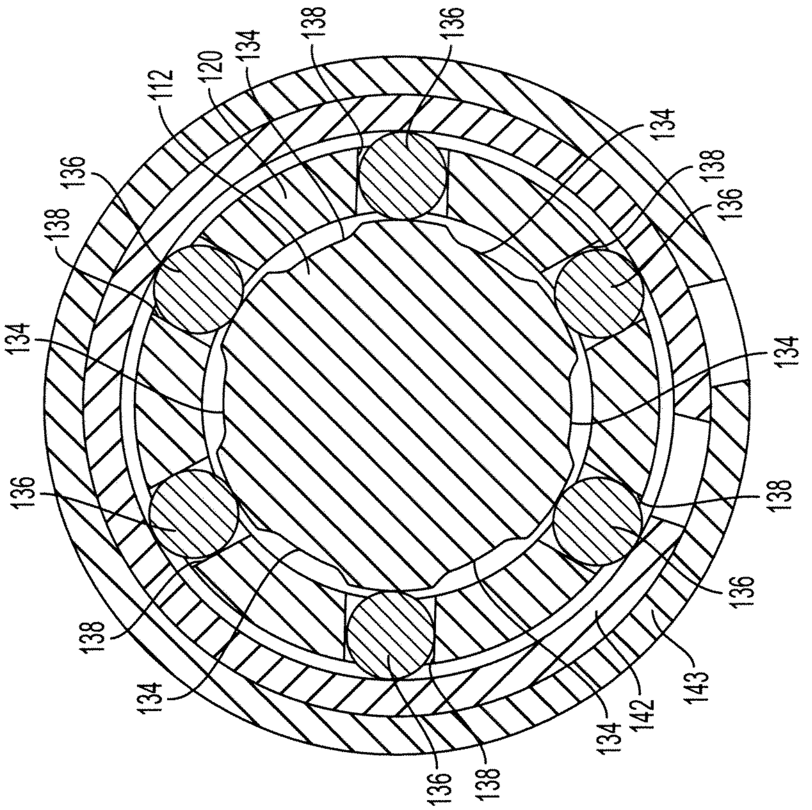
FIG. 13 is a cross-sectional view of the clutch of the tool of FIG. 6 in the disengaged condition and with the clutch lock-out assembly removed.
Figure 12:
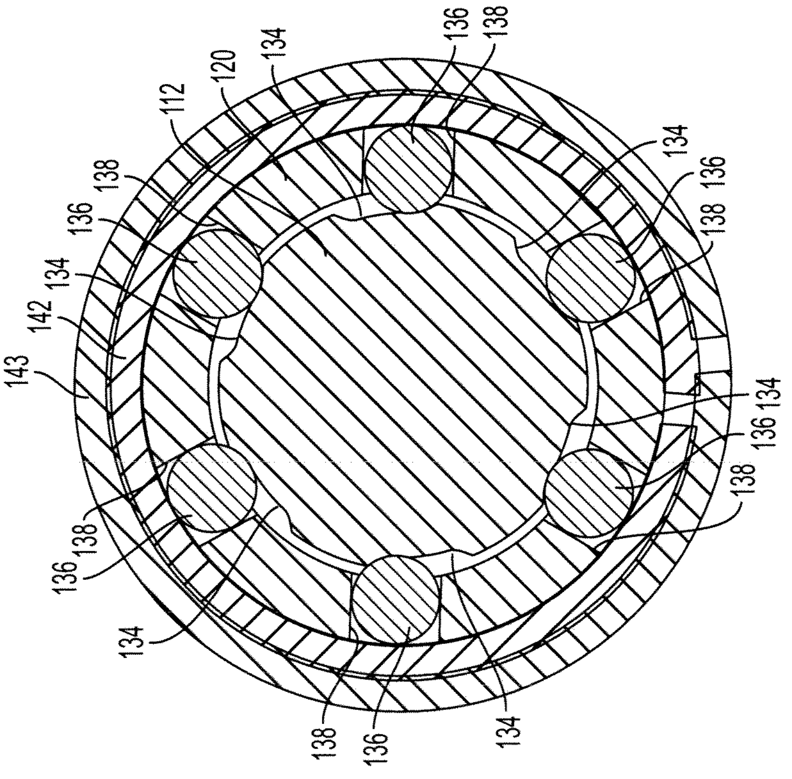
FIG. 12 is a cross-sectional view of the clutch of the tool of FIG. 6 in the engaged condition and with the clutch lock-out assembly removed.

Referring also to FIG. 12, when the clutch 130 is engaged, the spring bands 142 and 143 bias the rollers 136 into the grooves 138 of the input shaft 112 so that rotation of the input shaft 112 by the power tool is transmitted to the output shaft 120, and thus to the bit being held in the socket 126. Referring also to FIG. 13, when the torque input to the input shaft 112 exceeds a predetermined amount (e.g., when the torque output from the power tool exceeds the torque rating on the clutch assembly), the spring 142 expands, and the rollers 36 escape from the grooves 38 on the input shaft 12 so that no torque is transmitted from the input shaft 12 to the output shaft 20. In this way, the clutch assembly 30 protects the tool 10 and the bit from instances of excessively high torque.

Figure 14:
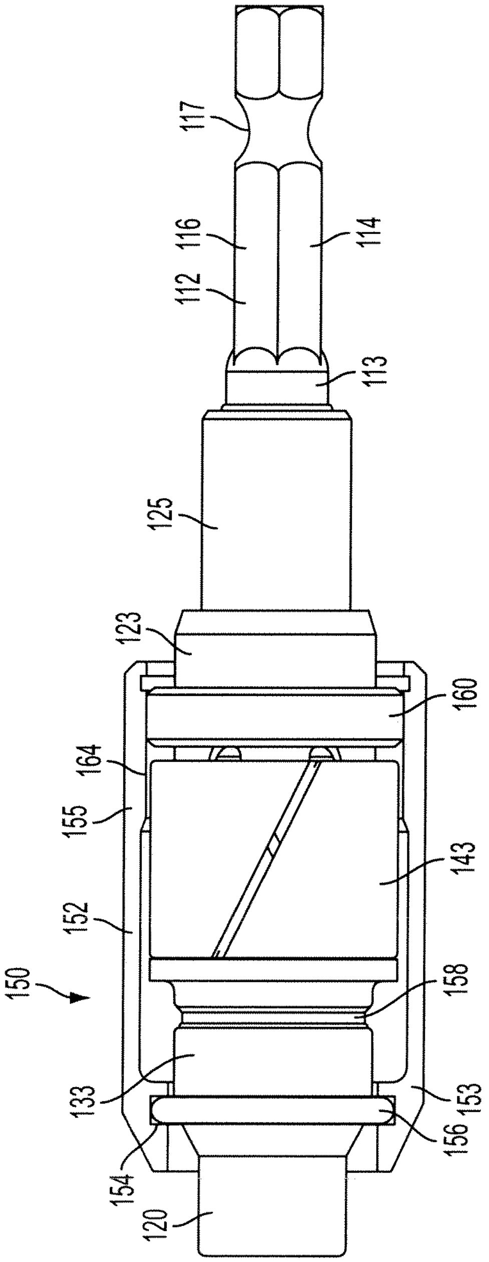
FIG. 14 is a side view, partially in cross-section, of the tool of FIG. 6, with the clutch lock-out assembly in the locked-out position.
Figure 15:
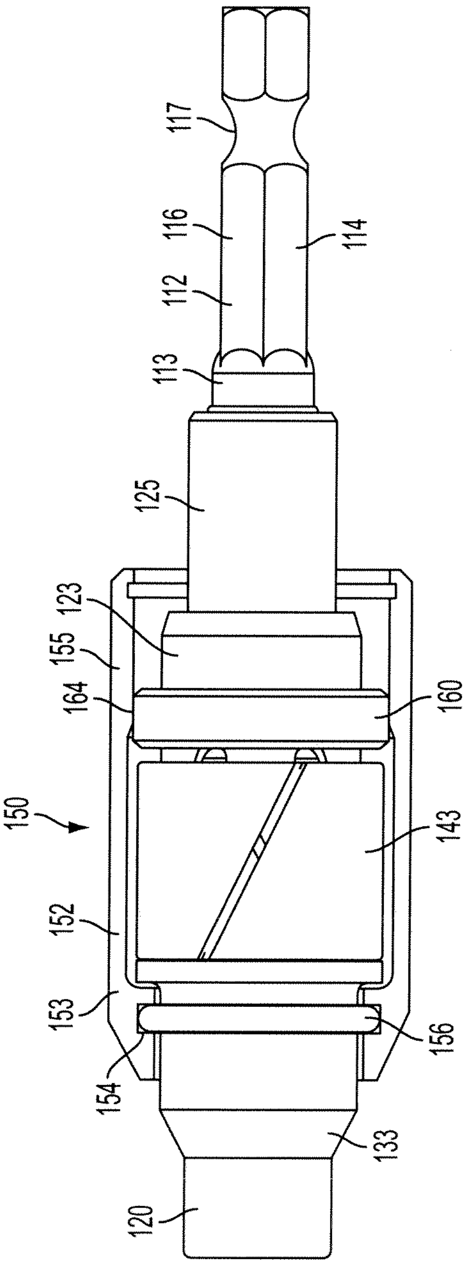
FIG. 15 is a side view, partially in cross-section, of the tool of FIG. 6, with the clutch lock-out assembly in the unlocked-out position.

Referring also to FIGS. 14 and 15, the tool 100 further includes a clutch lock-out assembly 150 for selectively locking out operation of the clutch 130. The clutch lock-out assembly 130 includes a bushing 152 with a front portion 153 and a rear portion 155. The bushing 152 is received over the outer spring band 143 and axially moveable between a forward or locked-out position (FIG. 14) and a rearward or unlocked-out position (FIG. 15). The front portion 153 of the busing 152 includes an internal annular groove 154 in which is received an O-ring 156, which supports the front portion 153 of the bushing 152 on the output shaft 120. When the bushing is in the forward position (FIG. 14), the O-ring 156 surrounds a portion of the front portion 133 of the output shaft 120, and when bushing is in the rearward position (FIG. 15), the O-ring 156 is seated in an annular groove 158 in the front portion 133 of the output shaft 120 to help retain the bushing 152 in the latter position. The rear portion 155 of the bushing 152 is supported on the spacer ring 160 and includes a retaining ring 158 that abuts the spacer ring 160 when in the forward position to prevent the bushing 152 from being removed in a forward axial direction.

The internal surface of the bushing 152 defines a shoulder 164. When the bushing 152 is in the forward position (FIG. 14), the shoulder 164 abuts against the outer spring band 143, preventing expansion of the inner spring band 142 and the outer spring band 143, which prevents disengagement of the pins 136 from the longitudinal grooves 138 of the input shaft 112. Thus, in the forward position, the input shaft 112 and output shaft 120 rotate together regardless of the amount of torque applied to the input shaft 112. When the bushing is in the rearward position (FIG. 15), the shoulder 164 is clear of the spring bands 142, 143, and they are allowed to expand and release the pins 136 from the longitudinal grooves 138 in the input shaft 112 when the predetermined torque threshold is exceeded. Thus, in the rearward position, the clutch 130 is permitted to act to prevent torque transmission from the input shaft 112 to the output shaft 120 when the predetermined torque threshold is exceeded.

Figure 18:
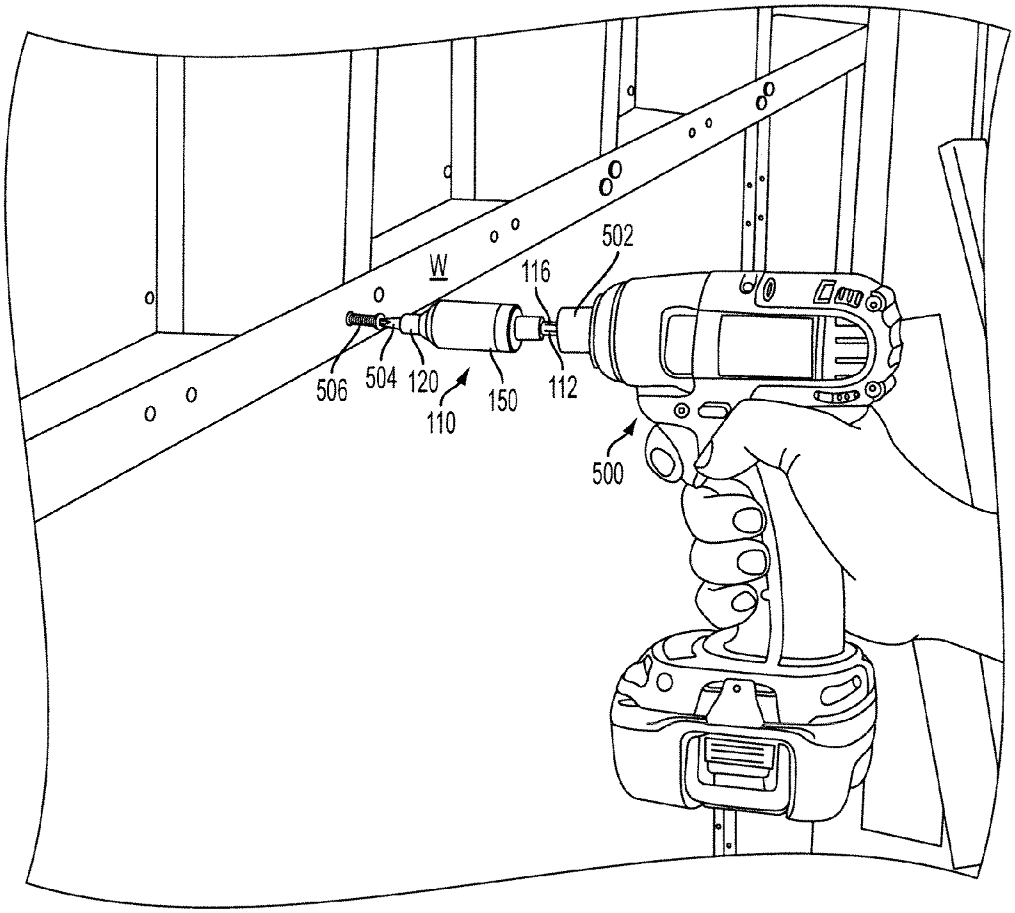
FIG. 18 is a perspective view showing the second embodiment of the tool in use with an impact driver.

Referring to FIG. 18, in one use, the hex-shaped shank 116 of the input shaft 112 is received inside and coupled to a hex-shaped cavity of a tool holder 502 of an impact driver 500. A bit, e.g., a screwdriving bit 504 is received in and coupled to the recess 126 of the output shaft 120 to drive a fastener, e.g., a screw 506 into a workpiece W. The clutch 150 is engaged and the impact driver 502 is actuated by the user to drive the screw 506 into the workpiece. If the torque input to the input shaft 112 exceeds a predetermined amount (e.g., when the torque output from the power tool exceeds the torque rating on the clutch assembly), the spring 142 expands, and the rollers 136 escape from the grooves 138 on the input shaft 112 so that no torque transmission from the input shaft 112 to the output shaft 120 is interrupted. In this way, the clutch assembly 130 protects the screwdriving bit 504 from excessively high torque.

Figure 19:
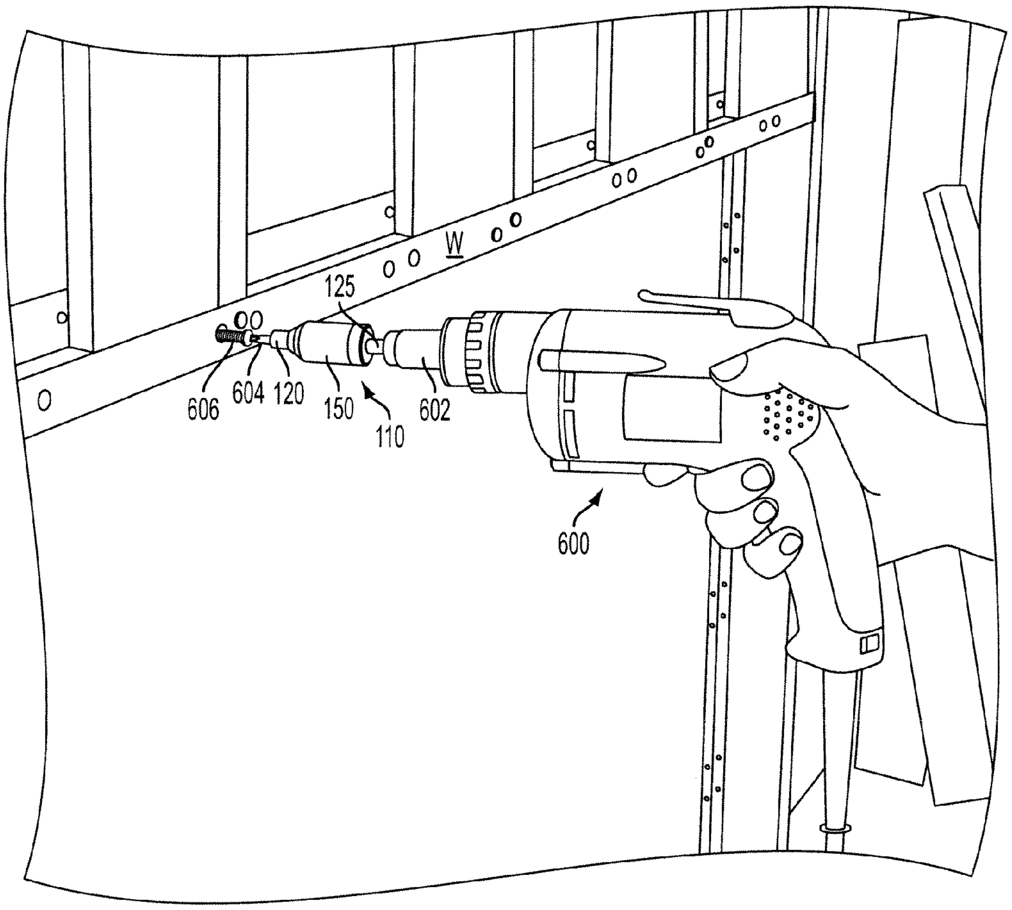
FIG. 19 is a perspective view showing the second embodiment of the tool in use with a screwgun.

Referring to FIG. 19, in an alternative use, the entire rear portion 114 of the input shaft 112, and at least a portion of the spacer sleeve 125 is received inside and coupled to a cavity of a nosepiece 602 of a drywall screwgun 600. The spacer sleeve 125 provides clearance for the nosepiece 602 to move axially relative to the input shaft 112 without releasing the input shaft 112 to actuate the clutch (not shown) that is inside the nosepiece 602. The structure and operation of the clutch inside of the nosepiece 602 is well understood to those of ordinary skill in the art. A bit, e.g., a screwdriving bit 604 is received in and coupled to the recess 126 of the output shaft 120 to drive a fastener, e.g., a screw 606 into a workpiece W. The clutch 150 is engaged and the screwgun 600 is actuated by the user to drive the screw 606 into the workpiece. If the torque input to the input shaft 112 exceeds a predetermined amount (e.g., when the torque output from the power tool exceeds the torque rating on the clutch assembly), the spring 142 expands, and the rollers 136 escape from the grooves 138 on the input shaft 112 so that no torque transmission from the input shaft 112 to the output shaft 120 is interrupted. In this way, the clutch assembly 130 protects the screwdriving bit 604 from excessively high torque.

Figure 16:
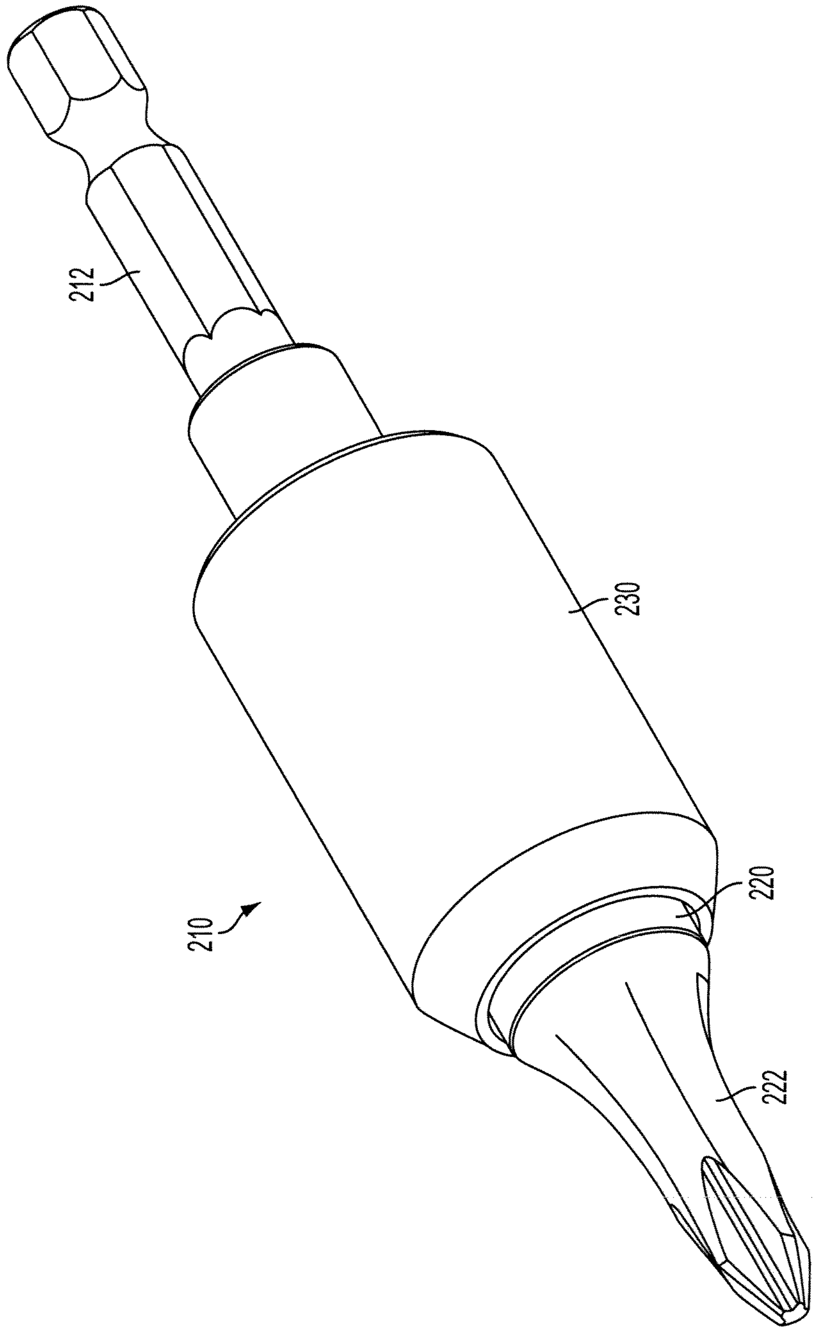
FIG. 16 is a perspective view of a third embodiment of a tool.

Referring to FIG. 16, in a third embodiment, a tool 210 for use with a power tool has a generally cylindrical input shaft 212, a generally cylindrical output shaft 220, and a clutch assembly 230 that are substantially the same as the input shaft 112, the output shaft 112 and the clutch assembly 130 of the second embodiment of the tool 110. The third embodiment of the tool 230 differs from the second embodiment of the tool 110 only in that the output shaft 220 is integrally coupled to a tool bit 222 (e.g., a screwdriving bit or a drill bit) so that the tool 210 functions as a tool bit, as opposed to a tool bit holder.

Figure 17:
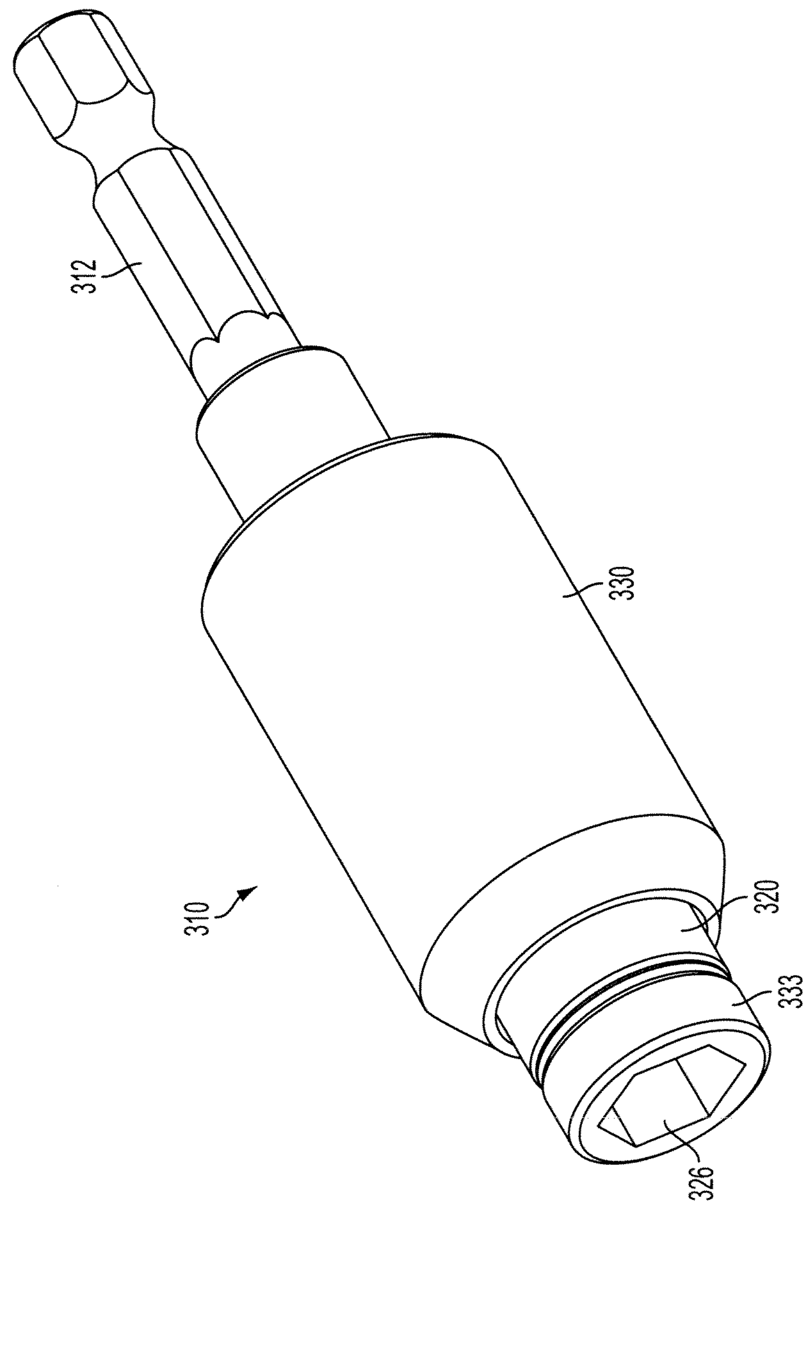
FIG. 17 is a perspective view of a fourth embodiment of a tool.

Referring to FIG. 17, in a fourth embodiment, a tool 310 for use with a power tool has a generally cylindrical input shaft 312, a generally cylindrical output shaft 320, and a clutch assembly 330 that are substantially the same as the input shaft 112, the output shaft 112 and the clutch assembly 130 of the second embodiment of the tool 110. The fourth embodiment of the tool 330 differs from the second embodiment of the tool 110 only in that the output shaft 320 includes a front portion 333 having a hex-shaped recess 326 that is configured to receive a head of a screw or a nut, so that the tool 320 functions as a nutdriver. There may be a magnet (not shown) disposed in the recess 326 to facilitate holding a screw or nut in the recess.

Numerous modifications may be made to the exemplary implementations described above. For example, a different design for the clutch can be used, such as by using round recesses and openings in the input and output shafts, and balls instead of pins. In addition, other types of springs may be used in the clutch. Further, the tension on the springs may be user adjustable to adjust the threshold torque setting of the clutch. Also, the tool holder can include other mechanisms for holding a bit instead of a magnet, such as spring clips and/or spring loaded balls. These and other implementations are within the scope of the invention.

What is claimed is:

1. A tool for use with a power tool, the tool comprising:

an input shaft having a front portion and a rear portion with a shank configured to be removably coupled to a power tool;

an output shaft having a front portion and a rear portion, the rear portion of the output shaft rotatably coupled to the front portion of the input shaft, the front portion of the output shaft configured to be coupled to at least one of a tool bit and a threaded fastener;

a clutch assembly releasably coupling the input shaft to the output shaft, the clutch assembly including at least one recess defined in one of the front portion of the input shaft and the rear portion of the output shaft, (ii) at least one aperture defined in the other of the front portion of the input shaft and the portion of the output shaft;

(iii) at least one roller received in the at least one aperture; and (iv) a spring received over the at least one roller to bias the at least one roller radially inwardly into the at least one recess, such that torque is transmitted from the input shaft to the output shaft when a torque threshold is not exceeded, and that enables release of the at least one roller radially outwardly from the at least one recess such that torque is not transmitted from the input shaft to the output shaft when a torque threshold is exceeded; and a control sleeve having a first portion with a first inner diameter and a second portion with a second, smaller inner diameter, wherein the control sleeve is received over and is axially moveable relative to the spring between a first position in which the first portion overlays the spring and the at least one roller, and a second position in which the second portion overlays the spring and the at least one roller to abut the spring.

2. The tool of claim 1, wherein the shank has at least a portion having a hex shaped cross-section.

3. The tool of claim 2, wherein the shank also includes a portion having a round cross-section disposed between the portion having the hex-shaped cross-section and the front portion of the input shaft to enable attachment of the shank to a screwgun.

4. The tool of claim 1, wherein the front portion of the output shaft is integral with a tool bit.

5. The tool of claim 1, wherein the at least one recess comprises a plurality of longitudinal grooves.

6. The tool of claim 5, wherein the at least one aperture comprises a plurality of longitudinal slots.

7. The tool of claim 6, wherein the at least one roller comprises a plurality of pins, each pin received in one of the plurality of longitudinal slots.

8. The tool of claim 1, wherein the spring comprises at least one spring band received over the at least one aperture and the at least one roller to bias the at least one roller into the at least one recess when the predetermined torque threshold is not exceeded, and that expands to release the pins from the longitudinal grooves when the predetermined torque threshold is exceeded.

9. The tool of claim 8, wherein the at least one spring band comprises an inner spring band and an outer spring band at least partially overlapping the inner spring band.

10. The tool of claim 1, wherein when the control sleeve is in the first position, the first portion of the control sleeve enables the at least one roller to move radially outward from the at least one recess, against the bias of the spring, when the torque threshold is exceeded.

11. The tool of claim 10, wherein when the control sleeve is in the second position, the second portion of the control sleeve prevents the at least one roller from moving radially outward from the at least one recess, against the bias of the spring, when the torque threshold is exceeded.

12. A tool comprising:

an input shaft having a substantially cylindrical front portion and a rear portion with a shank configured to be removably coupled to a power tool;

an output shaft having a substantially cylindrical rear portion and front portion configured to be coupled to at least one of a tool bit and a threaded fastener and a rear portion;

a plurality of recesses defined in one of the front portion of the input shaft and the rear portion of the output shaft;

a plurality of apertures defined in the other of the front portion of the input shaft and the portion of the output shaft, the plurality of apertures spaced radially outward from the plurality of recesses;

a plurality of rollers received in the plurality of apertures;

a substantially cylindrical spring circumferentially surrounding the rollers to bias the rollers radially inwardly to selectively engage the recesses, such that torque is transmitted from the input shaft to the output shaft when the rollers engage the recesses, and torque transmission from the input shaft to the output shaft is interrupted when the rollers do not engage the recesses; and a control sleeve having a first portion with a first inner diameter and a second portion with a second, smaller inner diameter, wherein the control sleeve is received over and is axially moveable relative to the spring between a first position in which the first portion surrounds the spring and the rollers, and a second position in which the second portion surrounds the spring and the rollers to abut the spring, wherein when the control sleeve is in the first position, the first portion of the control sleeve enables expansion of the spring and movement of the rollers out of engagement with the recesses when an output torque threshold is exceeded, to interrupt torque transmission from the input shaft to the output shaft.

13. The tool of claim 12, wherein when the control sleeve is in the second position, the second portion of the control sleeve does not enable expansion of the spring and movement of the rollers out of engagement with the recesses when the output torque threshold is exceeded.

14. The tool of claim 13, wherein the control sleeve is in the second position, the second portion of the control sleeve completely prevents interruption of torque transmission from the input shaft to the output shaft.

15. The tool of claim 12, wherein the shank has at least a portion having a hex shaped cross-section.

16. The tool of claim 12, wherein the front portion of the output shaft is integral with a tool bit head.

17. The tool of claim 12, wherein the recesses comprise a plurality of longitudinal grooves.

18. The tool of claim 17, wherein the apertures comprise a plurality of longitudinal slots.

19. The tool of claim 18, wherein the rollers comprises a plurality of pins, each pin received in one of the longitudinal slots.

20. The tool of claim 12, wherein the spring comprises an inner spring band and an outer spring band at least partially overlapping the inner spring band.

* * * * *